United States Patent Office 3,173,970
Patented Mar. 16, 1965

3,173,970
HYDROCARBON CONVERSION PROCESS AND CATALYST THEREFOR
William G. Nixon, Westchester, Ill., assignor to Universal Oil Products Company, Des Plaines, Ill., a corporation of Delaware
No Drawing. Filed Apr. 22, 1963, Ser. No. 274,810
10 Claims. (Cl. 260—683.65)

This application is a continuation-in-part of my copending application Serial No. 59,175, filed September 29, 1960, now Patent No. 3,130,244.

This invention relates to a conversion process for the conversion of isomerizable organic compounds and more particularly to a conversion process for converting isomerizable organic compounds into more useful compounds. More specifically, this invention is concerned with the conversion process for the isomerization of an isomerizable hydrocarbon utilizing a novel catalytic composition of matter.

In recent years with the advances in the automotive industry, fuels of relatively high octane ratings have been found necessary. Many methods have been provided for the production of high anti-knock fuels. These methods include such processes as alkylation, catalytic reforming, catalytic cracking, and high temperature thermal cracking and reforming operation. Other processes which may be considered in one sense auxiliary were developed such as isomerization which was employed to produce isoparaffins which subsequently were reacted with olefins to form a high octane number motor fuel fraction, commonly termed alkylate. In addition to the production of one or more of the reactants by alkylation, isomerization was also utilized to increase the anti-knock quality of saturated hydrocarbons such as paraffins and naphthenes found in selected fractions of gasolines and naphthas. An example of the latter type of operation is a process in which pentane and/or hexane fractions are isomerized to produce isopentanes and/or isomeric hexanes, respectively, which subsequently may be employed as blending stocks for automotive and aviation fuels.

In most of the above-mentioned isomerization processes, catalytic agents are employed to effect the desired molecular rearrangement. Ordinarily, these catalytic agents consist of metal halides, such as aluminum chloride, aluminum bromide, etc., which are activated by the addition of the corresponding hydrogen halide. These catalytic agents are very active and effect high conversion per pass of such compounds as n-butane. However, the activity of these catalysts is so high that the catalysts accelerate decomposition reactions as well as isomerization reactions with the result that the ultimate yield of isomerized product is reduced. This is particularly true as the molecular weight of the isomerizable compound increases through a homologous series, such as in going from normal butane to normal pentane and normal hexane to normal heptane. This cracking also considerably increases catalyst consumption by reaction of fragmental materials with the catalytic agent to form sludge-like material. In spite of what might have been predicted, these decompositions and/or cracking reactions cannot be reduced by simply lowering the reaction zone severity, for example, by reducing temperature or by increasing liquid hourly space velocity. At temperatures and space velocity which satisfactory isomerization reactions are obtained, these reactions are pronounced. I have discovered a catalytic agent which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable organic compounds utilizing a novel isomerization catalyst.

A specific object of this invention is to provide a novel method and a novel catalyst for isomerizing isomerizable organic compounds to provide the desired isomerized product in high yields without the inducing of other decomposition reactions.

One embodiment of this invention resides in a conversion process which comprises isomerizing an isomerizable organic compound at isomerization conditions in the presence of a catalyst comprising an oxide of nitrogen selected from the group consisting of nitric acid, nitrous acid, ammonium nitrate, ammonium nitrite and metallic oxides of nitrogen composited on a substantially anhydrous solid support.

A further embodiment of this invention resides in the conversion process which comprises isomerizing an isomerizable hydrocarbon at a temperature in the range of from about $-10°$ to about $300°$ C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite, and metallic oxides of nitrogen composited on a substantially anhydrous solid support.

A still further embodiment of the invention is found in a conversion process which comprises isomerizing an isomerizable hydrocarbon at a temperature in the range of from about $-10°$ to about $300°$ C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

A specific embodiment of this invention resides in a conversion process which comprises isomerizing n-butane at a temperature in the range of from about $-10°$ to about $300°$ C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on a substantially anhydrous refractory oxide support having a surface area in excess of 25 square meters per gram.

Still another specific embodiment of the present invention resides in a conversion process which comprises isomerizing methylcyclopentane at a temperature in the range of from about $-10°$ to about $300°$ C. and at a pressure in the range of from about atmospheric to about 200 atmospheres in the presence of a catalyst comprising an oxide of nitrogen selected from the group consisting of nitric acid, nitrous acid, ammonium nitrate, ammonium nitrite and metallic oxides of nitrogen composited on the substantially anhydrous refractory oxide support having a surface area in excess of 25 square meters per gram.

Other objects and embodiments referring to alternative isomerizable organic compounds and to alternative catalytic compositions of matter will be found in the following further detailed description of the invention.

The process of my invention is especially applicable to the isomerization of isomerizable saturated hydrocarbons including acyclic paraffins and cyclic naphthenes, and is particularly suitable for the isomerization of straight-chain and mildly branched-chain paraffins containing four or more carbon atoms per molecule, including normal butane, normal pentane, normal hexane, normal heptane, normal octane, etc., or cycloparaffins ordinarily containing at least 5 carbon atoms in the ring such as alkylcyclopentanes, and cyclohexanes, including methylcyclopentane, dimethylcyclopentane, cyclohexane, methylcyclohexane, dimethylcyclohexanes, etc. It is also applicable to the conversion of mixtures of paraffins and/or naphthenes such as those derived by selective fractionation and distillation of straight-run or natural gasolines and naphthas. Such mixtures of paraffins and/or naphthenes include so-called pentane fractions, normal hexane fractions, and mixtures thereof. The process of my invention is also suitable for the isomerization of olefins, for example, the isomerization of 1-butene to 2-butene, etc., the isomerization of 3-methyl-1-butene to 2-methyl-2-butene, etc. The process may also be used for the isomerization of alkyl aromatic hydrocarbons for example, the isomerization of ethylbenzene to diethylbenzene or xylene, the isomerization of propylbenzene to methylethylbenzene or trimethylbenzene, etc. Suitable modifications in operating conditions may be necessary when the process is utilized for other than the isomerization of saturated hydrocarbons and therefore the various processes are not necessarily equivalent.

As set forth hereinabove, the process of my invention is especially applicable to the isomerization of saturated hydrocarbons such as normal butane, normal pentane, normal hexane, etc., and mixtures thereof. Furthermore, the saturated hydrocarbons are usually derived as selected fractions from various naturally occurring petroleum streams. For example, they may be separated as individual components or, as certain boiling range fractions by selective fractionation and distillation of straight-run or natural gasolines and naphthas. Thus, the process of this invention may be successfully applied to and utilized for complete conversion of isomerizable hydrocarbons when these isomerizable hydrocarbons are present in minor quantities in various gas streams. Thus, the isomerizable hydrocarbon for use in the process of this invention need not be concentrated. For example, isomerizable hydrocarbons appear in minor quantities in various refinery gas streams, usually diluted with gases such as hydrogen, nitrogen, methane, ethane, propane, etc. These refinery streams containing minor quantities of isomerizable hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of the hydrocarbon content has not been available. This is particularly true for refinery gas streams known as off-gas streams containing relatively minor quantities of isomerizable hydrocarbons.

As hereinbefore set forth, the invention is concerned with the conversion process for the isomerization of isomerizable organic compounds and more particularly for the isomerization of isomerizable hydrocarbons, said process being effected in the presence of a catalyst which possesses a high degree of hydrocarbon conversion activity and is particularly effective as an isomerization catalyst for the isomerizable organic compounds hereinabove set forth. The catalyst comprises an oxide of nitrogen composited on and chemically bonded to a solid support. However, not every solid support can be utilized as a satisfactory one for disposal of an oxide of nitrogen thereon. The particular solid support which is to be utilized should possess a relatively high surface area and be substantially anhydrous or relatively free of water. In most cases this freedom from water of the support is achieved by a precalcination treatment of said support. This precalcination is carried out at relatively high temperature in the range of from about 400° C. to about 700° C. and for a time sufficient to effect substantial removal of adsorbed or combined water from the support. The time required for the dehydration will vary depending upon the support, and in addition, will depend upon whether the water is in a combined or in merely a physically adsorbed form. As hereinbefore set forth, the support is preferably although not necessarily, characterized by having the high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the oxides of nitrogen in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram and which has been freed from adsorbed water and which contains little combined water, is a satisfactory support. Celite, a naturally occurring mineral, after precalcination, is not a satisfactory support. Celite has a surface area of from about 2 to about 10 square meters per gram. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modification such as gamma-, eta-, and theta-alumina, although these are not necessarily of equivalent suitability. However, as is obvious from the above discussion, the limitation on the use of any particular support is one of freedom from combined or adsorbed water in combination with the high surface area of the support selected. In addition to the aforementioned gamma-, eta-, and theta-aluminas which may be utilized as solid supports, it is also contemplated that other refractory oxides which possess the necessary surface area characteristics and which are in a substantially anhydrous state such as silica or combinations thereof such as silica-alumina, silica-magnesia, alumina-silica-magnesia, alumina-thoria, alumina-zirconia, etc., may also be utilized as solid supports for the various oxides of nitrogen hereinafter enumerated which may be impregnated thereon or chemically composited therewith.

Oxides of nitrogen which are composited with the solid support hereinabove set forth include metallic oxides of nitrogen of which the metallic portion of the compound preferably comprises a metal capable of forming an oxide of nitrogen of Group VI of the Periodic Table, a metal of the Iron Group of Group VIII as well as alumina, etc.; such metallic oxides including aluminum nitrate, nickel nitrate, chromium nitrate, cobalt nitrate, ferric nitrate, etc. In addition to the hereinabove enumerated metallic oxides of nitrogen it is also contemplated within the scope of this invention that a refractory oxide support of the type hereinbefore set forth may be impregnated with a solution of ammonium nitrate, ammonium nitrite or with a solution of nitric acid or nitrous acid followed by the addition of a sufficient amount of ammonium hydroxide to render the composite alkaline in nature. Following the impregnation, the support is then calcined thereby driving off the ammonia and allowing the nitrate or nitrite to remain impregnated on and chemically bonded to the refractory oxide support. In addition to the aforesaid oxides of nitrogen the refractory oxide support may be also impregnated with concentrated nitric acid or nitrous acid without any further neutralization steps, said acid being utilized in an amount sufficient so that the final catalytic composite possesses from about 0.5 to about 15% by weight of nitrate or nitrite content.

The addition of the oxide of nitrogen to the refractory oxide support will enhance the surface-area characteristics of the support. The surface-area characteristics are defined as the surface area, expressed as square meters per gram; pore volume expressed as cubic centimeters per gram; and pore diameter expressed in Angstrom units (A.). It has been found that refractory inorganic oxides possessing greater surface area, coupled with a smaller pore diameter, results in improved adsorptive capacity, especially when serving as an isomerizing agent. As hereinbefore set forth, certain forms of alumina would possess the desired surface area characteistics may be utilized as the refractory oxide supports for the catalyst of this invention. The base alumina may be prepared by any of the well-known means of manufacture, one example of which is the addition of an alkaline reagent to a salt of aluminum in an amount sufficient to form aluminum hydroxide which upon drying and calcining, is converted to alumina. Likewise, if silica is to be utilized as the refractory oxide support it may be prepared by acidification of water glass. Similarly, if the refractory oxide support comprises both alumina and silica these components may be prepared by separate, successive or coprecipitate means.

The catalyst which is utilized in the process of the present invention may be prepared by any method known to the art. For example, a refractory oxide base previously prepared by the methods hereinbefore set forth is then combined with an oxide of nitrogen by conventional means such as treating the base with a solution of said oxide of nitrogen, said oxide of nitrogen being added in an amount sufficient to allow the finished catalyst to contain from about 0.5 to about 15% or more by weight of nitrate or nitrite. Following this, the combined material is then dried by air oxidation in a furnace tube or muffle furnace, etc. The finished catalyst comprising the oxide of nitrogen composited on the refractory oxide support is then utilized as a conversion catalyst, and especially as an isomerization catalyst in the usual manner.

The process of this invention utilizing the catalyst hereinbefore set forth may be effected in any suitable manner and may comprise either a batch or a continuous type of operation. The preferred method by which the process of this invention may be effected is a continuous type of operation. One particular method is the fixed bed operation in which the isomerizable organic compound is continuously charged to a reaction zone containing a fixed bed of the desired catalyst, said zone being maintained at the proper operating conditions of temperature and pressure, that is, a temperature in the range of from about $-10°$ to about 300° C., and a pressure including a pressure of from about atmospheric to about 200 atmospheres or more. The liquid hourly space velocity (the volume of charge per volume of catalyst per hour) is maintained in the reaction zone in the range of from about 0.1 to about 20 or more, and preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as hydrogen, nitrogen, argon, oxygen, air, etc., may also be charged to the reaction zone if necessary. Another continuous type of operation comprises the moving bed type in which the isomerizable organic compound and the catalyst bed move either concurrently or countercurrently to each other while passing through said reaction zone. Yet another continuous type of operation which may be used is the slurry type in which the catalyst may be carried into the reaction zone as a slurry in the isomerizable organic compound.

Still another type of operation which may be used is the batch type of operation in which a quantity of the isomerizable organic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means such as, for example, by washing, drying, fractional distillation, crystallization, etc.

It is also contemplated within the scope of this invention that the catalyst of the type hereinbefore set forth may be utilized for promoting miscellaneous organic reactions, the catalyst being employed in essentially the same way as when used for isomerizing isomerizable organic compounds in that the reactions are essentially in suspension of liquid phase in various types of equipment. Typical cases of reactions in which the present type of catalyst may be used include the polymerization of olefinic hydrocarbons such as butylenes, etc.; the alkylation of cyclic compounds with olefins, the cyclic compounds, including aromatics, polycyclic compounds, naphthenes, and phenols; condensation reaction such as those occurring between ethers and aromatics, etc.; reactions involving the hydrohalogenation of unsaturated organic compounds; ester formation by the interaction of carboxylic acids and olefins; and the like. The specific procedures for utilizing the present type of catalyst in miscellaneous organic reactions will be determined by the chemical and physical characteristics and the phase of the reacting constituents.

The following examples are given to illustrate the process of the present invention, which, however, are not intended to limit the generally broad scope of the present invention in strict accordance therewith.

*Example 1*

In this example, about 100 cc. of alumina spheres were placed in a glass furnace tube and treated with dry air while increasing the temperature to 300° C. The furnace was maintained at 300° C. while the air oxidizing was continued. The furnace was maintained at 300° C. for an additional 30 minutes during which time the alumina was treated with a mixture of 100 cc. of nitric oxide gas per minute and 600 cc. of air per minute. After this treatment, the system was then treated with 600 cc. of air per minute for 30 minutes at 300° C. The system was then cooled to room temperature and a catalyst sample was taken.

A portion of the catalyst was then placed in another glass furnace tube and the catalyst was treated with 600 cc. of air per minute at 300° C. once again. The catalyst was then swept with nitrogen while the temperature of the catalyst was decreased to 180° C.

Butene-1 was then passed through the catalyst and exit gases were collected in the condenser cooled by acetone and Dry Ice. The reaction continued for 30 minutes. It was observed that the catalyst remained white in color.

The butene-1 charge rate was maintained while the catalyst temperature was increased from 180° C. to 300° C. It was observed that the catalyst became a very light tan color at about 300° C. Exit gases were collected in the condenser and it was observed that the condenser contained an aqua colored product. The reaction at 300° C. was continued for a period of 1 hour.

The product taken from the condenser was analyzed by infrared analysis and it was determined from the infrared spectrum that the spectrum comprised moderate to intense bands indicative of cis and trans butene-2. A minor amount of butene-1 was also indicated in the infrared spectrum.

Example II

Another catalyst is prepared by impregnating 50 grams of alumina spheres with about 85 cc. of a solution containing 5 cc. of concentrated nitric acid. The resulting composite is then adjusted to a pH of about 9.0 using ammonium hydroxide. Following this, the composite is then placed in a furnace tube which is slowly heated to a temperature of about 300° C. and maintained thereat for a period of about 2 hours while air oxidizing the composite using approximately 800 cc. of air per minute. During the heating of the composite to the desired temperature it will be noted that ammonia gas is evolved from the catalyst thereby leaving an oxide of nitrogen on the refractory oxide base. The finished catalyst will contain about 10 weight percent nitrate.

Example III

Yet another catalyst is prepared by impregnating alumina spheres with a solution containing concentrated nitric acid after which the composite is dried to remove excess water. Following this the composite is placed in a furnace tube and air oxidized to a catalyst temperature of 300° C. using 800 cc. of air per minute. The finished catalyst will contain approximately 6 weight percent nitrate.

Example IV

A catalyst similar to those set forth in the above examples is prepared by compositing a cobalt nitrate solution containing approximately 15% cobalt nitrate with a refractory oxide base comprising alumina spheres. The resulting composite is then placed in a muffle furnace or furnace tube and is slowly heated to a temperature of about 300° C. Upon reaching this temperature the catalyst is air oxidized using approximately 800 cc. of air per minute for an additional period of about 1 hour. The catalyst will contain about 6 weight percent nitrate.

Example V

The catalyst prepared according to Example II is utilized in an appropriate isomerization apparatus to determine the isomerization activity of said catalyst. In the experiment, 100 grams of the finished catalyst is placed in the isomerization reaction zone and normal butane is charged to said reaction zone. The reactor is maintained at about 750 p.s.i.g. and about 150° C. Substantial conversion of the normal butane to isobutane is obtained as is evidenced by gas-liquid chromatography.

Example VI

The catalyst prepared according to Example III is utilized in an appropriate isomerization apparatus to determine the isomerization activity of said catalyst. In the experiment, 100 grams of the finished catalyst is placed in the isomerization reaction zone and normal pentane is charged thereto. The reactor is maintained at about 800 p.s.i.g. and about 150° C. Substantial conversion of the normal pentane to isopentane is obtained as is evidenced by gas-liquid chromatography.

Example VII

The catalyst prepared according to Example IV is utilized in the isomerization apparatus described in the previous example to determine the isomerization activity of said catalyst. In the experiment, 100 grams of the finished catalyst is placed in the isomerization reaction zone and normal hexane is charged thereto. The reactor is maintained at about 750 p.s.i.g. and about 150° C. Substantial conversion of the normal hexane to 2,2-dimethylbutane, 2,3-dimethylbutane, 2-methylpentane, and 3-methylpentane is obtained as is evidenced by gas-liquid chromatography.

I claim as my invention:

1. A conversion process which comprises isomerizing an isomerizable saturated hydrocarbon at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous solid support.

2. A conversion process which comprises isomerizing an isomerizable saturated hydrocarbon at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous refractory oxide support having a surface area in excess of 25 square meters per gram.

3. A conversion process which comprises isomerizing an isomerizable saturated hydrocarbon at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous alumina support having a surface area in excess of 25 square meters per gram.

4. A conversion process which comprises isomerizing an isomerizable saturated hydrocarbon at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous alumina-silica support having a surface area in excess of 25 square meters per gram.

5. A conversion process which comprises isomerizing an isomerizable saturated hydrocarbon at a temperture in the range of from about −10° to about 300° C. and at a pressure in the range of from about atmospheric to about 200 atmospheres in the presence of a catalyst comprising an oxide of nitrogen derived from nitric acid composited on a substantially anhydrous alumina support having a surface area in excess of 25 square meters per gram.

6. A conversion process which comprises isomerizing normal butane at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous refractory oxide support having a surface area in excess of 25 square meters per gram.

7. A conversion process which comprises isomerizing normal pentane at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous refractory oxide support having a surface area in excess of 25 square meters per gram.

8. A conversion process which comprises isomerizing normal hexane at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous refractory oxide support having a surface area in excess of 25 square meters per gram.

9. A conversion process which comprises isomerizing normal heptane at a temperature in the range of from about −10° to about 300° C. and at a pressure in the range of from about atmospheric to about 200 atmospheres in the presence of a catalyst comprising an oxide of nitrogen selected from the group consisting of nitric acid, nitrous acid, ammonium nitrate and ammonium nitrite composited on a substantially anhydrous refractory oxide support having a surface area in excess of 25 square meters per gram.

10. A conversion process which comprises isomerizing methylcyclopentane at a temperature in the range of from about −10° to about 300° C. and at a pressure in the range of from about atmospheric to about 200 atmospheres in the presence of a cataylst comprising an oxide of nitrogen selected from the group consisting of nitric acid, nitrous acid, ammonium nitrate and ammonium nitrite composited on a substantially anhydrous refractroy oxide support having a surface area in excess of 25 square meters per gram.

References Cited by the Examiner
UNITED STATES PATENTS

| | | | |
|---|---|---|---|
| 2,547,380 | 4/51 | Fleck | 260—683.65 |
| 2,608,534 | 8/52 | Fleck | 260—683.65 |
| 2,888,501 | 5/59 | Folkins et al. | 260—683.65 |
| 2,935,544 | 5/60 | Miller et al. | 260—683.65 |

ALPHONSO D. SULLIVAN, *Primary Examiner.*